United States Patent
Olim et al.

(10) Patent No.: US 7,124,497 B1
(45) Date of Patent: Oct. 24, 2006

(54) METHOD OF CONTROLLING LOCALIZED SHAPE OF A DATA HEAD AND FOR CHARACTERIZING THE SHAPE

(75) Inventors: Moshe Olim, Eden Prairie, MN (US); Stefan Weissner, Minneapolis, MN (US); Ling Ma, Eden Prairie, MN (US); Clarence Matson, Eden Prairie, MN (US); Sarah R. Marotz, Bloomington, MN (US); James Wagner, Prior Lake, MN (US); Zine-Eddine Boutaghou, North Oaks, MN (US); Peter R. Goglia, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 523 days.

(21) Appl. No.: 10/643,059

(22) Filed: Aug. 18, 2003

(51) Int. Cl.
  *G11B 5/127* (2006.01)
(52) U.S. Cl. ............... 29/603.09; 29/603.07; 29/603.12; 700/117
(58) Field of Classification Search ........... 700/117; 29/603.07, 603.15; 219/212.62–121.69; 360/75, 135
See application file for complete search history.

(56) References Cited

U.S. PATENT DOCUMENTS

| | | | |
|---|---|---|---|
| 5,266,769 A | 11/1993 | Deshpande et al. | 219/121.69 |
| 5,442,850 A | 8/1995 | Kerth | 29/603.12 |
| 6,073,337 A * | 6/2000 | Strom | 29/603.12 |
| 6,108,170 A | 8/2000 | Crawforth et al. | 360/234.3 |
| 6,130,807 A * | 10/2000 | Marchon | 360/135 |
| 6,295,719 B1 * | 10/2001 | Strom | 29/603.12 |
| 6,321,440 B1 | 11/2001 | Crawforth et al. | 29/603.1 |
| 6,330,133 B1 | 12/2001 | Samuelson | 360/243.3 |
| 6,555,294 B1 * | 4/2003 | Albertini et al. | 430/311 |
| 6,662,069 B1 * | 12/2003 | Khlif | 700/117 |
| 6,700,727 B1 * | 3/2004 | Crane et al. | 360/75 |
| 6,950,266 B1 * | 9/2005 | McCaslin et al. | 360/75 |
| 2002/0035778 A1 * | 3/2002 | Hashimoto et al. | 29/603.09 |
| 2003/0019095 A1 | 1/2003 | Chang et al. | 29/603.09 |

* cited by examiner

*Primary Examiner*—Leo Picard
*Assistant Examiner*—Sheela S. Rao
(74) *Attorney, Agent, or Firm*—Westman, Champlin & Kelly

(57) ABSTRACT

A method and apparatus are provided characterizing the shape of a surface such as a bearing surface on a slider and for processing the shape. The shape is characterized by fitting a curve having a desired shape to measurement data and then determining residual deviations from the desired shape within localized regions. The surface is processed by selecting a material stress pattern to be applied to a working surface of the slider based on measured and desired contour shape parameters in a plurality of localized areas on the bearing surface. The measured contour shape parameter within a first of the plurality of localized areas is weighted more heavily than those within the other localized areas.

26 Claims, 6 Drawing Sheets

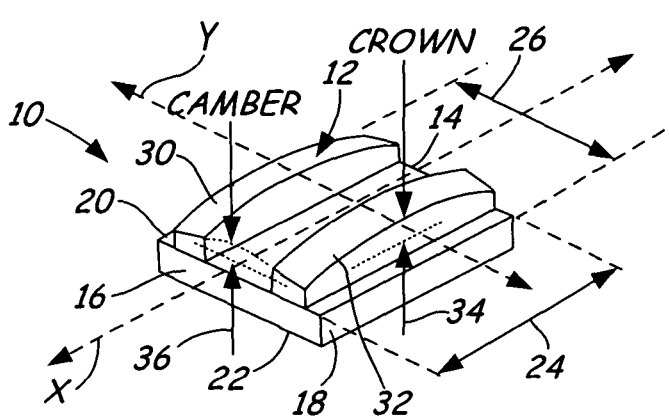
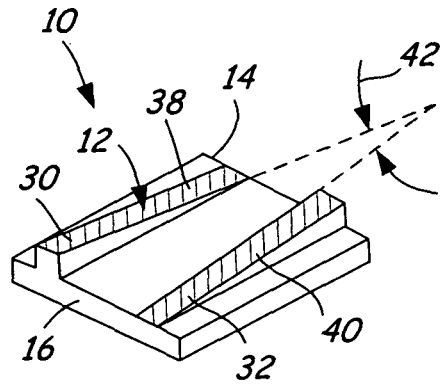
FIG. 1    FIG. 2
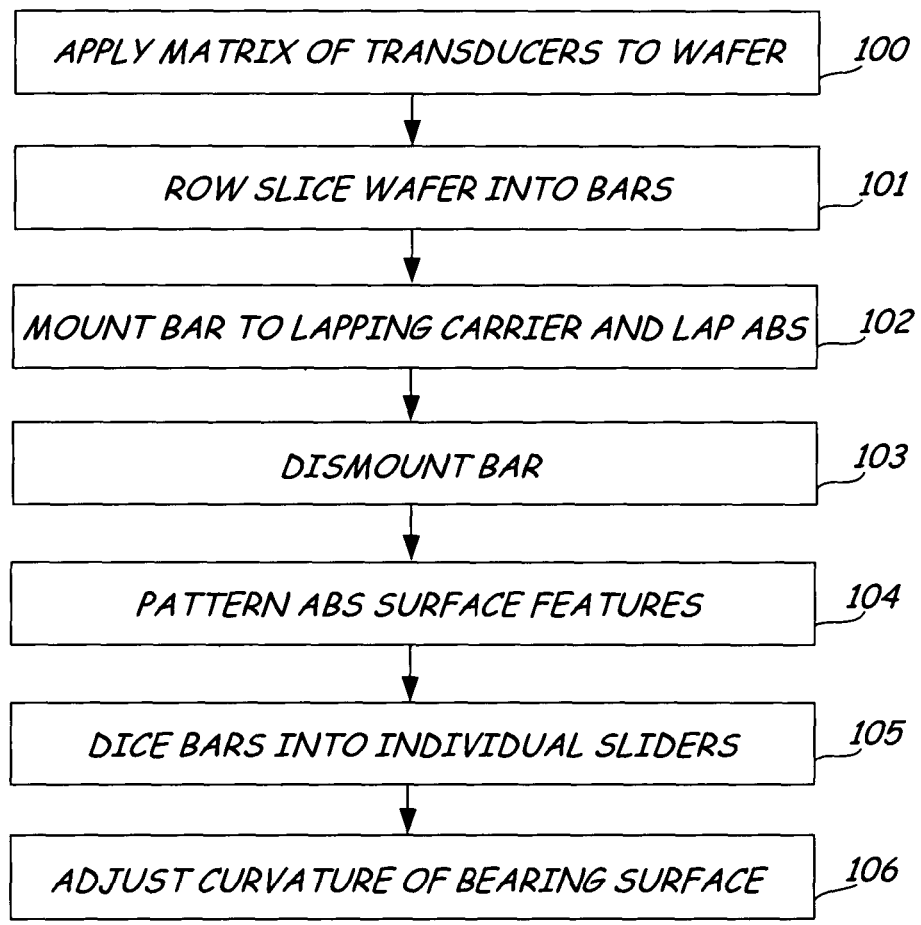
FIG. 3

METHOD OF CONTROLLING LOCALIZED SHAPE OF A DATA HEAD AND FOR CHARACTERIZING THE SHAPE

FIELD OF THE INVENTION

The present invention relates to data storage systems and, more particularly, to a method of characterizing the topological shape of a surface and for controlling the shape characteristics of a transducing head, such as a hydrodynamic bearing slider.

BACKGROUND OF THE INVENTION

Data storage systems use magnetic media for storage of digital information. For example, disc drives use rigid or flexible discs coated with a magnetizable medium for storing information in a plurality of circular, concentric data tracks. The discs are mounted on a spindle motor, which causes the discs to spin and the surfaces of the discs to pass under respective hydrodynamic (e.g., air) bearing disc head sliders. The sliders carry transducers, which write information to and read information from the disc surface. An actuator mechanism moves the sliders from track to track across the surfaces of the discs under control of electronic circuitry. The actuator mechanism includes a track accessing arm and a suspension for each slider. The suspension includes a load beam and a gimbal. The load beam provides a load force, which forces the slider toward the disc surface. The gimbal is positioned between the slider and the load beam, or is integrated in the load beam, to provide a resilient connection that allows the slider to pitch and roll while following the topography of the disc.

The slider includes a slider body having a bearing surface, such as an air bearing surface, which faces the disc surface. As the disc rotates, the air pressure between the disc and the air bearing surface increases and creates a hydrodynamic lifting force, which causes the slider to lift and fly above the disc surface. The preload force supplied by the load beam counteracts the hydrodynamic lifting force. The preload force and the hydrodynamic lifting force reach an equilibrium, which determines the flying height of the transducer relative to the disc surface. The transducer is typically mounted at or near the trailing edge of the slider. The geometry of the bearing surface effects the flying characteristics of the slider, such as the dynamic pitch and roll attitude of the slider.

In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders.

It is often desirable to fabricate a slider such that the bearing surface has a positive curvature along the length and width of the slider. Length curvature is known as crown curvature. Width curvature is known as cross or camber curvature. The proper setting and control of crown and cross curvature improves flying height variability over varying conditions, improves wear on the slider and the disc surface, and improves takeoff performance by reducing stiction between the slider and the disc surface. Therefore, there is a need for a method of controlling the slider curvature and for a method of accurately characterizing the surface shape so that the curvature control is accurate and the resulting performance of the slider can be predicted.

A traditional method of creating crown or cross curvature is to lap the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. Therefore, more efficient and controllable methods of effecting air bearing surface curvature are being developed.

U.S. Pat. No. 5,442,850 discloses a method of controlling curvature by inducing a preselected amount of compressive stress within the bearing surface by impinging the bearing surface with particles for a preselected amount of time. U.S. Pat. No. 5,266,769 discloses a process of controlling slider curvature in which the air bearing surfaces are first patterned and then a chosen pattern of stress is produced on the back side of the slider by laser oblation or sand blasting to selectively remove stressed material and thereby create a desired crown and cross curvature of the bearing surface.

U.S. Pat. No. 5,982,583 discloses a method of effecting slider curvature through the application of laser-induced anisotropic tensile stress, which allows one of the crown and cross curvature to be changed to a greater extent than the other curvature. The use of laser scribe lines to adjust curvature are also disclosed in U.S. Pat. Nos. 6,108,170, 6,321,440, 6,548,009, 6,531,084, and 6,441,385, for example.

While the above methods improve curvature control, additional control is desired. Traditional methods of curvature control view crown and cross curvature as global metrics of the slider as a whole, not within localized areas within the slider. Also, traditional methods attempted to control some of the shape parameters of the slider while ignoring that changes aimed at controlling any given shape parameter may impact other important slider parameters. Improved methods of controlling the shape parameters are therefore desired.

Similarly, traditional methods of characterizing the slider shape, either prior to or after curvature control methods have been applied, describe the global curvature of the slider. For example, the slider has been characterized by global crown, cross and twist curvature values. These methods have not captured the finer details of the slider shape, thereby making curvature control methods and performance models less accurate.

For example in one prior art method, the global crown, cross and twist curvature values are derived from a second-order polynomial fit to data representing measured heights at a plurality of locations on the air bearing surface. The curvature of the slider is measured at discrete points $(x_i, y_i)$ and a least-square fit is performed to minimize the error between measured data $(z_i)$ and a quadratic polynomial:

$$\Sigma[z_i - (a + bx_i + cy_i + dx_i^2 + ex_iy_i + fy_i^2)]^2 = \min \qquad \text{EQ. 1}$$

where $z_i$ is the measured height of the air bearing surface at location "i", $x_i$ represents a location along a longitudinal "x" axis of the slider, $y_i$ represents a location along a transverse "y" axis of the slider, and the coefficients a, b, c, d, e, and f are the results of the least-square fit. Once the coefficients a, b, c, d, e and f are determined, the crown, cross and twist are given by:

$$crown = \frac{-d * sliderlength^2}{4}$$

$$camber = \frac{-f * sliderwidth^2}{4}$$

$$twist = -e * sliderlength * sliderwidth$$

These three parameters describe the global curvature of the slider, not the details of the slider shape. Improved shape characterization techniques are desired, which solve this problem and enhance measurement and modeling capabilities.

SUMMARY OF THE INVENTION

One embodiment of the present invention is directed to a method of processing a head slider having a bearing surface. The method selects a material stress pattern to be applied to a working surface of the slider based on measured and desired contour shape parameters in a plurality of localized areas on the bearing surface. The measured contour shape parameter within a first of the plurality of localized areas is weighted more heavily than those within the other localized areas.

Another embodiment of the present invention is directed to a method of processing a head slider having a bearing surface. The method includes: (a) receiving a measure of a contour shape parameter within each of a plurality of localized areas on the bearing surface; (b) receiving a corresponding desired contour shape parameter for each of the plurality of localized areas; (c) forming a mathematical expression as a function of an overall deviation of a shape of the bearing surface from a desired shape based on local deviations of the contour shape parameters from the corresponding desired shape parameters; and (d) selecting a material stress pattern to be applied to a working surface of the slider from a plurality of stress patterns in order to reduce the mathematical expression.

Another embodiment of the present invention is directed to an apparatus for processing a head slider having a bearing surface. The apparatus includes a device for selecting a material stress pattern to be applied to a working surface of the slider based on measured and desired contour shape parameters in a plurality of localized areas on the bearing surface. The measured contour shape parameter within a first of the plurality of localized areas is weighted more heavily than those within the other localized areas. A further device applies the material stress pattern to the working surface of the slider to induce a shape change in the plurality of localized areas.

Another embodiment of the present invention is directed to a method of characterizing the topological shape of a surface. The method includes: (a) measuring heights along the surface to produce height measurement data; (b) fitting a target curved surface equation having at least one target shape characteristic to the measurement data to produce a fitted target surface equation; (c) determine deviation of the height measurement data from the fitted target surface equation to produce deviation data; and (d) fitting a deviation surface equation to the deviation data, wherein the deviation surface equation characterizes the topological shape relative to the target surface equation.

Another embodiment of the present invention is directed to an apparatus for characterizing the topological shape of a bearing surface on a disc head slider. The apparatus includes a measurement device for measuring heights along the bearing surface to produce height measurement data. A processing device fits a target curved surface equation having at least one target shape characteristic to the measurement data to produce a fitted target surface equation and determines deviation of the height measurement data from the fitted target surface equation to produce deviation data. The processing device then fits a deviation surface equation to the deviation data, wherein the deviation surface equation characterizes the topological shape relative to the target surface equation.

BRIEF DESCRIPTION OF THE DRAWINGS

FIG. 1 is a perspective view of a disc head slider, as viewed from a bearing surface, which illustrates cross and crown curvature.

FIG. 2 is a perspective view of a disc head slider, as viewed from a bearing surface, which illustrates twist curvature.

FIG. 3 is a flow chart illustrating a slider fabrication process according to one embodiment of the present invention

DETAILED DESCRIPTION OF ILLUSTRATIVE EMBODIMENTS

Figure 4:
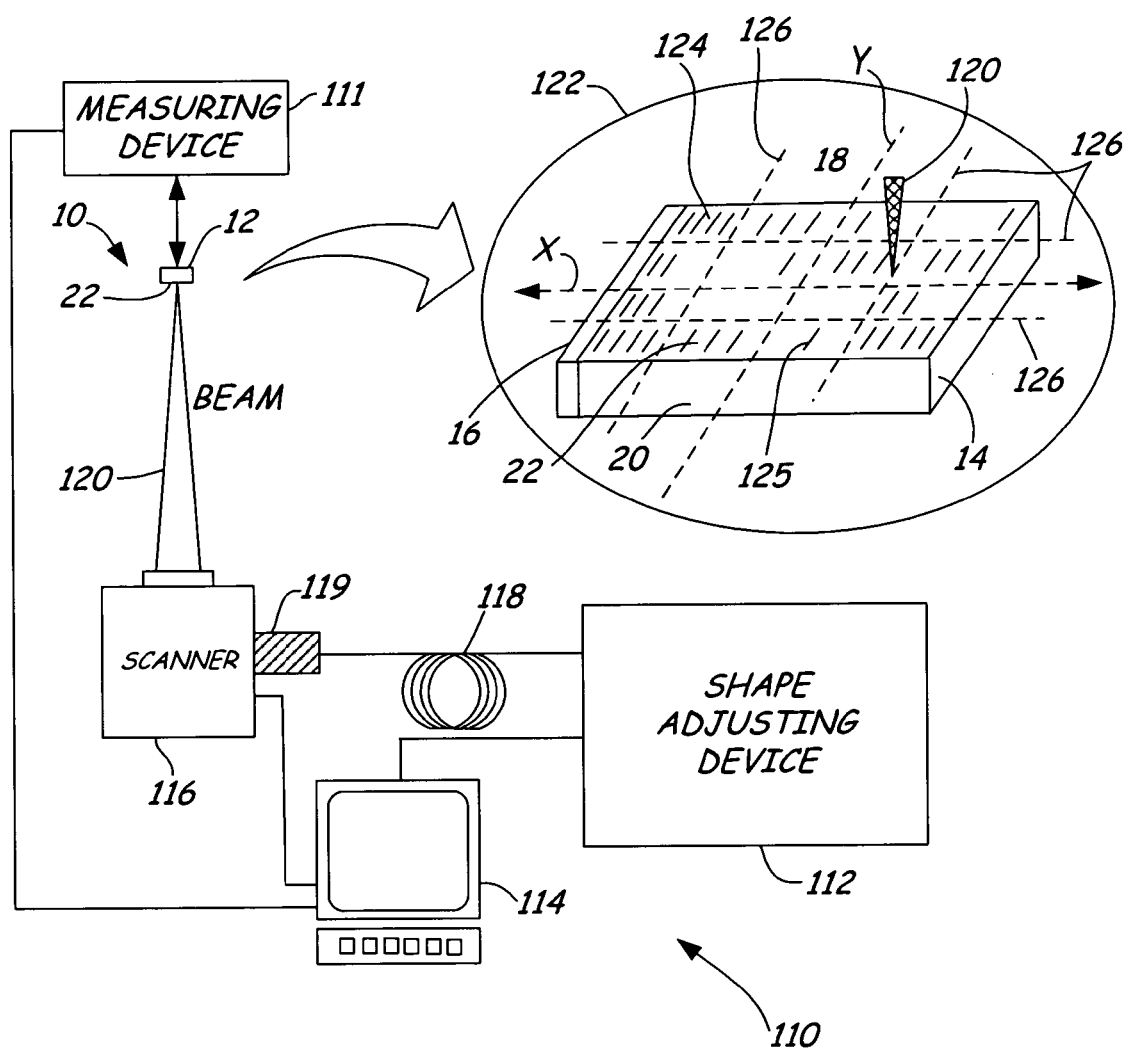
FIG. 4 is a diagram of an apparatus for adjusting the contour characteristics of a slider according to one embodiment of the present invention.

FIG. 1 is a perspective view of a basic disc head slider 10, as viewed from a bearing surface 12. Slider 10 has a leading edge 14, a trailing edge 16, side edges 18 and 20 and back surface 22. Slider 10 has a length 24, measured from leading edge 14 to trailing edge 16, and a width 26, measured from side edge 18 to side edge 20. In the embodiment shown in FIG. 1, bearing surface 12 includes side rails 30 and 32. However, slider 10 can include a variety of bearing surface geometries. These surface geometries can be configured for non-contact, direct-contact or pseudo-contact recording. Slider 10 carriers a read/write transducer (not shown), which is typically mounted along trailing edge 16, but can be positioned at other locations on slider 10 in alternative embodiments.

In most applications, it is desirable for slider 10 to have a positive curvature along length 24 and width 26. "Crown" curvature is a measure of the curvature of bearing surface 12 along length 24. Crown curvature is negative for a concave surface, positive for a convex surface and zero for a flat surface. "Cross" curvature is a measure of the curvature of bearing surface 12 along width 26. The sign of the cross curvature has the same convention as the sign of the crown curvature. Cross curvature is also known as "camber" curvature. A common method of measuring the crown and cross curvatures is to measure the differences 34 and 36 between the highest points along length 24 and width 26 and the lowest points along length 24 and width 26. Typical crown and cross curvatures are on the order of zero to 1.5 microinches for a "30 series" slider having a length of 49 mills and a width of 39 mills. Along with a positive crown and cross curvature, it is often desired that slider 10 has no "twist". Twist is the tilt between rails 30 and 32, along slider length 24, which can be caused by stresses in the slider substrate material.

FIG. 2 is a perspective view of slider 10 illustrating twist along slider length 24. The amount of twist can be measured by fitting planes 38 and 40 to the bearing surfaces of rails 30 and 32 and measuring an angle 42 between the fitted planes 38 and 40. The sign of angle 42 indicates the direction of twist and the relative orientation of the rails to each other.

FIG. 3 is a flow chart illustrating a slider fabrication process according to one embodiment of the present invention. The slider body is formed from a substrate known as a wafer. At step 100, a matrix of transducers is applied to the top surface of the wafer. At step 101, the wafer is sliced along rows into a plurality of bars. The slicing operation is typically performed with a diamond-tipped saw blade or wheel, for example. Each bar includes a plurality of individual slider bodies, with each slider body having a corresponding transducer. The sliced surfaces become bearing surface 12 and back surface 22, while the top surface of the wafer becomes trailing edge 16 of each slider body. The slicing process induces surface stress in bearing surface 12 and back surface 22 due to plastic deformation of the surfaces. This surface stress is typically compressive. In addition, the slicing wheel can form marks in bearing surface 12 and back surface 22 due to mis-alignment of the wheel and wheel vibration. Therefore, following the slicing operation, bearing surface 12 and back surface 22 are referred to as "rough sliced surfaces."

At step 102, each bar is mounted to a carrier, and the bearing surface 12 of each bar is machined by a lapping process prior to forming the bearing features. The lapping process is controlled to obtain a target throat height or target resistance for each transducer in the case of a magneto-resistive type of transducer. At step 103, the bar is dismounted from the lapping carrier. At step 104, the bearing surface features are patterned by ion milling, chemical etching or reactive ion etching (RIE), for example, with one or more masking operations. Once the bearing surface features have been formed, the bars are diced along a plurality of diced lanes into individual slider bodies, at step 105. The diced surfaces become side edges 18 and 20 shown in FIG. 1. The dicing operations can also induce surface stress in side edges 18 and 20.

The stresses in the slider substrate material following the above fabrication steps cause each slider body to have some initial or "incoming" shape parameters or "metrics", which are typically not the desired shape parameters. These parameters include the initial crown, cross and twist curvatures discussed above. The incoming shape parameters are then adjusted at step 106 by altering the surface stresses on each slider according to the various embodiments of the present invention.

Traditional curvature control methods have used techniques such as laser scribing for adjusting surface stresses on the slider body to achieve a desired overall crown, cross or twist curvature of the slider while ignoring shape parameters within localized areas on the slider and other parameters that may affect slider performance. It has been found that conventional global shape parameters such as crown, cross and twist curvature are not satisfactory predictors of the fly performance of the slider. For example, these metrics alone do not sufficiently predict the pole tip fly height (PTFH) of the read/write transducer relative to the disc surface.

Therefore, some embodiments of the present invention use additional metrics, such as local shape parameters in localized areas on the slider and sensitivities of fly characteristics of the slider to the local shape parameters. For example in one embodiment, local slider shape parameters are adjusted while taking into account that any stress change that is induced on the slider to adjust one local shape parameter has a global effect on all shape parameters of the slider. In addition, fly characteristics such as the pole tip fly height and the dynamic pitch and role attitude of the slider can be controlled by using the sensitivities of these characteristics to the local shape parameters when selecting a surface stress pattern to be applied to the slider.

In fact, the fly height of any point whose location on the slider is known can be controlled by controlling localized shape parameters. If the pole tip recession (recession of the pole tip relative to the bearing surface of the slider) is known or can be assumed when curvature control is applied, then the sensitivity of the transducer fly height to the local shape parameters can be calculated. A surface stress adjustment pattern can therefore be applied to the slider to adjust the local shape parameters to achieve a desired transducer fly height. This would, to some extent be equivalent to reducing pole tip recession variability from one slider to the next since the transducer would have a more controlled fly height given variations in pole tip recession.

FIG. 4 is a diagram of an apparatus 110 for adjusting local shape parameters of slider 10 toward desired values. Apparatus 110 includes local shape metric measuring device 111, a shape-adjusting device (such as a laser light source) 112, a processing device, such as programmed computer 114, and scanner 116. Programmed computer 114 operates measuring device 111, shape-adjusting device 112, and scanner 116 according to a sequence of instructions stored in a memory (not shown), which is associated with the computer, and user commands provided by a user through a user interface (also not shown). Computer 114 can include a single device or multiple devices connected to the appropriate elements in apparatus 110.

During the shape adjustment process, each slider is sequentially moved into a working position relative to beam 120 and measuring device 111. The sequence of instructions, when executed by computer 114, cause apparatus 110 to measure the shape parameters with measuring device 111, select a stress adjustment pattern, and then alter the surface stresses on back surface 22 (or another working surface on slider 10) in the selected pattern. In one embodiment, the pattern is selected based on the measured shape parameters, predetermined desired shape parameters, and predetermined transfer functions that relate each stress change pattern with changes in the shape parameters and with changes in fly characteristics of the slider, such as fly height, pitch and roll.

Measuring device 111 can include an interferometer, for example, which is capable of producing accurate and repeatable curvature measurements. In one embodiment, shape-adjusting device 112 includes a laser, which generates coherent light having continuous power at a wavelength of about 1100 nm, which is delivered to scanner 116 over a 5 micrometer fiber-optic cable 118, for example. Fiber-optic cable 118 is coupled to scanner 116 through a system of lenses 119, which expand the 0.5 mm diameter beam to a collimated beam of about 8 mm in diameter, for example. Scanner 116 passes the 8 mm beam through a two-axis galvanometer and then focuses the beam on back surface 22 through a flat-field objective lens. The two-axis galvanometer includes a set of two mirrors that allow planar x-y motion of the focused beam on the work surface of slider 10. However, other optical elements can be used in alternative embodiments.

As beam 120 is scanned along the working surface of slider 10, the laser beam melts back surface 22 along the scan line, which reduces or eliminates preexisting compressive stresses along the scan line. When the molten material solidifies, new anisotropic tensile stress is added to back surface 22. The added anisotropic tensile stress causes the slider substrate to bulge from the surface opposite to the surface being treated. Thus, treatment on back surface 22 causes a controlled change in the surface shape on bearing surface 12. The wavelength of beam 120 is preferably near the infrared region and provides for enough heating of back surface 22 without material removal. With a continuous wave laser beam, the tensile stress induced during cooling of the substrate material is aligned predominantly parallel to the scan direction. However, other light beam operating parameters can also be used to alter material stresses in or on a working surface of slider 10 to effect a change in one or more shape parameters on bearing surface 12 (with or without added tensile stress). In addition, other shape-adjusting devices can be used. These devices can operate based on a heating process, a mechanical process or a material removal process, for example, to alter the stress in a selected pattern in alternative embodiments of the present invention.

An example of a laser scan or "burn" pattern applied by scanner 116 is shown in detail area 122, according to one embodiment of the present invention. Beam 120 is operated to provide localized stress management on back surface 22. The laser burn pattern can be applied in one step or a sequence of steps, which are interleaved with one or more shape measurements. For example, one or more scan lines 124 and 125 can be applied in each of a plurality of localized regions, defined by dashed lines 126, in a direction parallel to transverse slider axis "X". Each region can be "burned" or "not burned", and the amount of burn (number, density or length of the scan lines) in each area can be selected. Also, the direction of the scan lines in one or more of the regions can be parallel to longitudinal slider axis "Y" or in any other direction in alternative embodiments of the present invention.

The shape parameters can again be measured, and any final stress changes can be made by applying one or more additional scan lines in any region on back surface 22, or applying scan lines in an area not previously "burned".

1. Parameters Used to Select Burn Pattern

In one embodiment of the present invention, a large number of parameters or "metrics" are used to select the optimal burn pattern that is applied to the back surface of the slider. These parameters include local shape parameters and combinatorial parameters that are affected by the local shape parameters.

a. Local Shape Parameters

As mentioned above, the local shape parameters are measured within localized areas on the bearing surface of the slider. For example in one embodiment, three different shape parameters are measured and then adjusted in six separate, localized areas on the bearing surface for a total of eighteen local shape parameters. For each localized area, these shape parameters include the slope along the slider's transverse axis X, the slope along the slider's longitudinal axis Y, and the height of a point in the localized area (along a "Z-axis" that is orthogonal to the X and Y axes). Other localized shape parameters can also be used.

The local slopes along the X and Y axes and the vertical height of the localized area are representative of how well the localized area fits onto a desired surface shape for the slider.

b. Combinatorial Parameters

In one embodiment, the combinatorial parameters include deviations of predicted pole tip fly height (PTFH) and dynamic pitch and roll attitudes of the slider from target values at the inner-diameter and outer-diameter of the disc. These fly characteristics are predicted using the above-described local shape parameters and predetermined sensitivities of the fly characteristics to the local shape parameters. The three fly characteristics are predicted at both the inner and outer diameters of the disc, for a total of six combinatorial parameters. The six combinatorial parameters are more representative of the expected performance of the slider than the overall crown, cross and twist curvatures of the slider used in previous methods. More accurate control of these parameters can therefore result in a significant increase in manufacturing yield during fabrication of the sliders and better performance of the final product.

The eighteen local shape parameters and the six combinatorial parameters provide a total of 27 parameters that can be used for selecting a burn pattern in one embodiment of the present invention.

Figure 5:
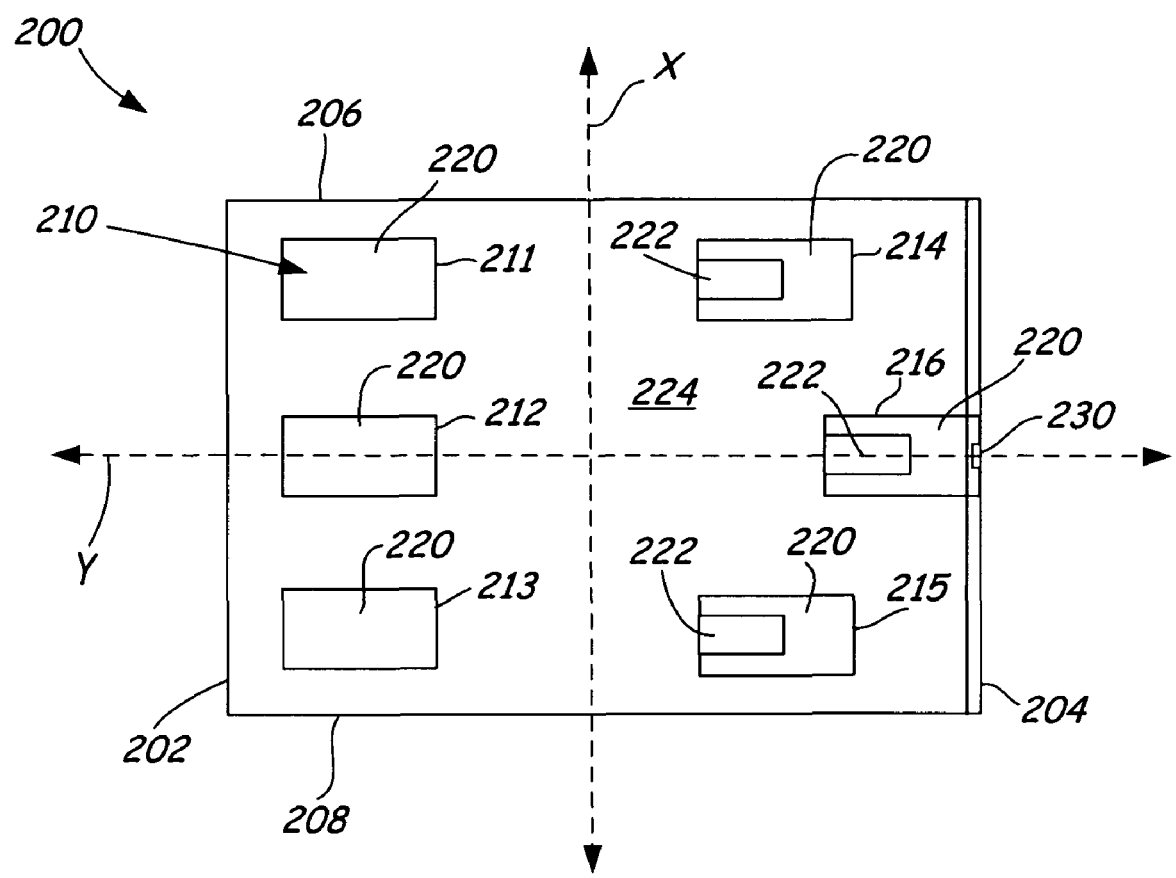
FIG. 5 is a bottom plan view of an example of a slider having a plurality of localized areas in which shape parameters can be measured and controlled.

2. Example of a Bearing Surface on which Local Shape Parameters can be Measured in Localized Areas FIG. 5 is a bottom plan view of an example of a slider 200 having a plurality of localized areas in which the above-described shape parameters can be measured and controlled. Slider 200 includes a leading edge 202, a trailing edge 204, side edges 206 and 208, longitudinal axis "Y" and transverse axis "X". Slider 200 has a bearing surface 210 formed by six bearing pads 211–216. Pads 211–216 each have an upper surface 220 that forms part of bearing surface 210. Upper surfaces 220 can be generally coplanar with one another or lie in separate planes. Also, the number and arrangements of pads 211–216 and their geometries can vary in alternative embodiments of the present invention. In addition, one or more of the pads 211–216 can be coupled to one another through additional surface features.

In this embodiment, bearing pads 211–213 are aligned generally along leading slider edge 202, with pads 211 and 213 being positioned along side edges 206 and 208, respectively, and pad 212 being positioned generally along longitudinal axis Y. Pads 211–214 generate large pressure peaks that assist slider 200 in taking-off from the disc surface and provide slider 200 with a positive pitch angle during normal operation. With a positive pitch angle, leading edge 202 flies at a greater distance from the disc surface than trailing edge 204.

Pads 214 and 215 form trailing bearing surfaces, which are positioned rearward of pads 211 and 213, along side edges 206 and 208, respectively. Pads 214 and 215 are disposed on opposite sides of longitudinal axis Y to provide slider 200 with a certain amount of roll stiffness. Pad 216 is positioned along trailing slider edge 204 and is roughly centered with respect to longitudinal axis Y. Pad 216 forms a center pad along which a transducer 230 is fabricated. Pads 214–216 further include a convergent channel or trench 222, which is recessed from bearing surfaces 220 and raised relative to a recessed central area 224 of slider 200. Trenches 222 generate large pressure gradients along bearing surfaces 220, rearward of the trenches.

Transducer 230 is positioned generally along longitudinal axis Y so that the flying height of transducer of 230 is relatively insensitive to variations in the roll angle of slider 200 about the longitudinal axis Y. Also, transducer 230 is positioned near the trailing edge 204 of slider 200 such that the transducer is near the closest point on slider 200 to the disc surface (known as the "close point flying height") when slider 200 flies with a positive pitch angle.

The particular geometric pattern of bearing surface 210 or the location of transducer 230 are not important to the embodiments of the present invention. The geometry shown in FIG. 5 is provided simply to show a variety of localized areas on the bearing surface in which local shape parameters can be measured. In one embodiment described in more detail below with respect to FIG. 9, each bearing surface 220 is treated as a separate localized area on bearing surface 210 in which the local shape parameters are measured. These localized areas can correspond to the entire local bearing surface or a portion of the local bearing surface.

3. Measurement of Local Shape Parameters

In one embodiment of the present invention, shape metric measuring device 111 (shown in FIG. 4) measures three shape parameters within each of the six localized areas defined by bearing surfaces 220 shown in FIG. 5. As discussed above, these shape parameters can include, for example, slope along transverse axis X ("X-slope"), slope along longitudinal axis Y ("Y-slope"), and the height ("Z-offset") of a point on the bearing surface. Based on the contour measurements taken by measuring device 111, processor 114 fits a plane to the data, which approximates the surface of the localized area. One method of fitting a plane to the data is described in more detail below with reference to FIG. 8. Other methods can also be used.

Processor 114 then calculates the X-slope and Y-slope offsets of the plane in micro-radians (urad) and Z-offset of a point on the plane in micro-inches (uin). The Z-offset measurement reflects the height of the localized area relative to a desired height. The height measurements can be made relative to a reference location on the slider. The X-slope and Y-slope offsets represent deviations in slope along the X and Y axes from the desired slopes.

Figure 6:
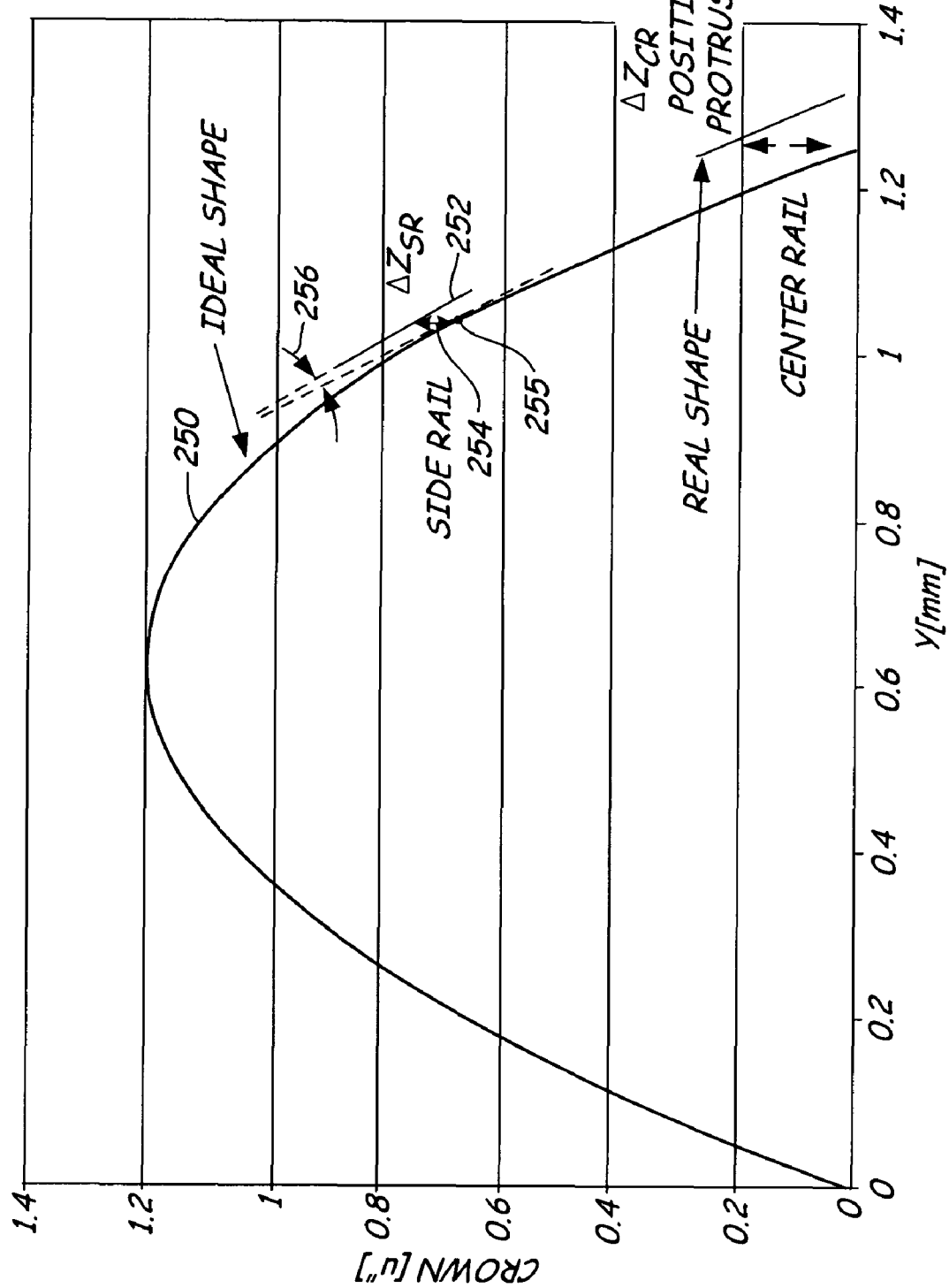
FIG. 6 is a graph illustrating an example of a desired crown curvature of a slider as a function of distance along the longitudinal axis.

FIG. 6 is a graph illustrating an example of a desired crown curvature 250 of slider 200 as a function of distance along the longitudinal axis Y, from leading edge 202 toward trailing edge 204. Line 252 represents a plane that has been fitted to the bearing surface 220 of one of the trailing side pads 214 or 215 in FIG. 5. Arrow 254 represents the Z-offset or deviation in the height of bearing surface 220 relative to desired height at point 255. Arrow 256 represents the deviation in the slope of line 252 relative to a desired slope 258 of line 250, at point 255.

4. Burn Pattern Selection

In one embodiment of the present invention, the burn pattern is selected to minimize the overall deviation of the outgoing shape of slider 200 from the desired shape. The overall deviation is minimized using the measured incoming local shape parameters, predetermined transfer functions relating the responses of the local shape parameters to the burn pattern, and sensitivities of the combinatorial parameters to the responses of the local shape parameters. Certain shape and/or combinatorial parameters can be weighted more heavily than others.

For example, the Z-offset of trailing, center bearing pad 216 directly affects the pole tip flying height (PTFH) of transducer 230. Therefore it may be desirable to optimize the Z-offset of bearing pad 216 to a greater extent than the Z-offsets of the other bearing pads 211–215 or the other shape parameters. This can be accomplished by defining the deviation as a weighted sum of deviations of each metric. The "closeness" of the shape of slider 200 to the desired shape can be quantified using a calculated error that is a weighted sum of the squares of the deviations of all of the shape parameters. Using knowledge of the response of any given shape parameter to any possible burn pattern, the burn pattern that minimizes the error can be selected.

For example, Equation 3 can be used by processor 114 to define the total error:

$$\text{Deviation} = \text{Error} = \sum_{i=1}^{\text{all shape metrics}} ws_i \left(sm_i^{predicted}\right)^2 + \sum_{i=1}^{\text{all combinatorial metrics}} wc_i \left(cm_i^{predicted}\right)^2 \quad \text{EQ. 3}$$

where:

$ws_i$=the weight coefficient of a particular shape parameter (e.g., Z-offset, X-slope, Y-slope) in any of the localized areas;

$sm_i^{predicted}$=the predicted deviation in the shape parameter for metric "i" after a particular burn pattern has been applied to the slider;

$wc_i$=the weight coefficient for a particular combinatorial metric "i"; and $cm_i^{predicted}$=the predicted deviation in the combinatorial parameter for metric "i" after the burn.

Each predicted shape parameter can be defined as:

$$sm_i^{predicted} = sm_i^{incoming} + \sum_{j=1}^{\text{all burn patterns}} f_{ij} \quad \text{EQ. 4}$$

where:

$f_{ij}$=the transfer function relating any particular burn pattern "j" to any shape parameter "i".

Similarly, the predicted combinatorial parameters can be defined as:

$$cm_i^{predicted} = F(sm^{predicted}, cm^{predicted} \text{ sensitivities}) = \sum_{j=1}^{\text{all shapes metrics}} S_{ij} sm_j^{predicted} \quad \text{EQ. 5}$$

where:

$S_{ij}$=the sensitivity of the combinatorial parameter "i" to a shape parameter "j".

Equations 3–5 recognize that all shape and combinatorial parameters change with each burn pattern. Equations 3–5 take these interdependencies into account to minimize the overall deviation of the outgoing shape of the slider from the desired shape. Also, certain shape and combinatorial parameters can be weighted more than others by assigning different weight coefficients $ws_i$ and $wc_i$ to different parameters "i" to achieve an outgoing shape that has the best possible performance as defined for a particular application. The transfer functions and sensitivities can be empirically determined based on observed changes in any shape parameter or combinatorial parameter to any "unit burn".

5. Burn Areas

In the embodiment shown in FIG. 4, the back surface 22 of the slider is used as the working surface and is divided into a number (N) of burn areas defined by dashed lines 126. In this case, N=16. Each burn area has the option of being burned or not burned for a binary control in each burn area. With sixteen burn areas there are a total of $2^{16}$ possible burn patterns. An algorithm used by computer 114 calculates the expected outcome ($sm_i^{predicted}$, $cm_i^{predicted}$) of applying any one of the $2^{16}$ burn patterns to the incoming shape metrics using Equations 4 and 5 and selects the pattern that minimizes the expected deviation in Equation 3.

Therefore, knowing the values of the incoming shape parameters and the sensitivities of the combinatorial parameters, the algorithm can predict the overall error value in Equation 3 for each possible burn pattern, resulting in $2^{16}$ error values in the above-example. The bur pattern that corresponds to the mimimum error value is selected and applied to the slider. Again, certain parameters can be given move weight than other shape parameters by assigning a greater weight coefficient to that parameter.

In an alternative embodiment, each burn area has three levels of control, including "no burn", "half burn" and "full burn". Additional control can be achieved by selecting the number of scan lines, the density of scan lines and/or the length of the scan lines in each burn area.

In another alternative embodiment, the back of the slider is also divided into N burn areas. Rather then using a burn/no burn approached as described in the previous examples, the response of each shape or combinatorial parameter to a burn in each of the N burn areas is determined as a continuous function. The optimal amount of the burn in each burn area (e.g., number, density or length of the scan lines) can then be determined using, for example, a least square fit approach, where Equation 3 is partially differentiated with respect to the burn amount in each burn area. The result of the differentiation is equated to zero. The resulting N equations are then solved for the optimal burn amount in each burn area. In one embodiment, the number of burn lines in each area is constrained between zero and some maximum number.

In another alternative embodiment, the back of the slider is also divided into N burn areas. The response of each shape parameter to a burn in each of the N burn areas is determined as a continuous function. Burn patterns that include an amount of burn in each burn area are then calculated so that each burn pattern affects only one shape parameter (changes this shape parameter by a unit change), and has substantially no impact on any of the other shape parameters. Thus, each shape parameter has an associated burn pattern. Then, for a given incoming slider, a scaling factor is applied to each of the burn patterns. The scaling factor is the magnitude of the corresponding metric for this slider. The amount of burn required in each burn area is then computed by superimposing the burn amounts required in each burn area for each metric. Other methods and algorithms can also be used. There are a large number of mathematical strategies for reducing or minimizing a function, and the above-strategies are provided as examples only.

Figure 7:
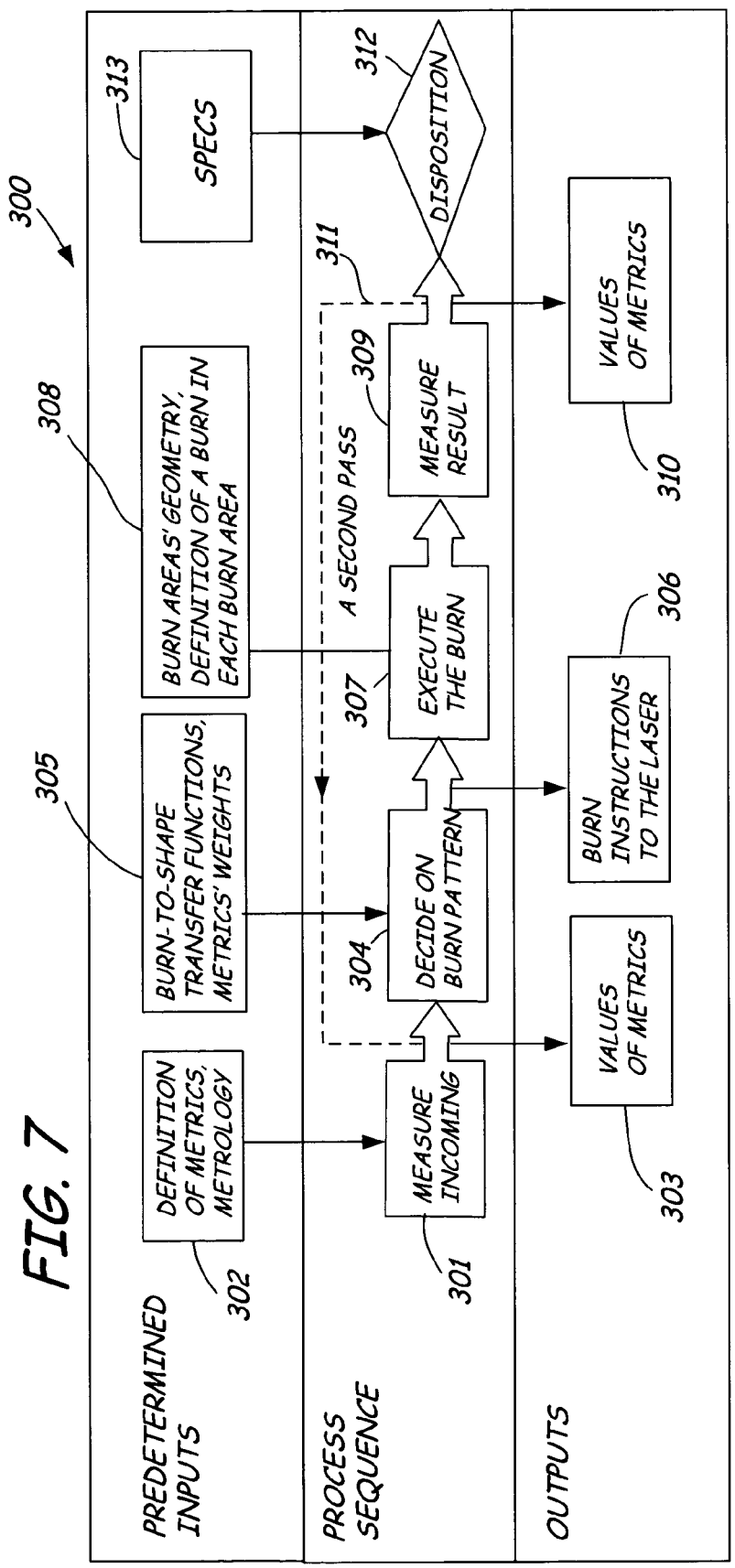
FIG. 7 is a flow chart illustrating a method of adjusting the contour characteristics of a slider according to one embodiment to the present invention.

FIG. 7 is a flow chart illustrating a method 300 of adjusting the contour characteristics of a slider according to one embodiment to the present invention in which the above-examples can be implemented. Method 300 is described with reference to the apparatus shown in FIG. 4. However any other suitable apparatus can be used to perform method 300. At step 301, measuring device 111 measures the incoming shape parameters based on predetermined definitions of each shape parameter and metrology information stored in the memory associated with processor 114. These definitions are represented by block 302 and define each parameter and the location on the slider at which the parameter should be measured. The value of each measured parameter is then stored for further processing, as represented by box 303.

At step 304, computer 114 selects a burn pattern based on the stored shape parameters 303 and the predetermined burn-to-shape transfer functions, the weight of each parameter, and the sensitivities of the combinatorial parameters to the predicted outgoing shape parameters. This information is represented by box 305. Once the desired burn pattern has been selected at step 304, computer 114 generates the appropriate burn instructions 306 for operating the laser. Computer 114 generates the burn instructions 306 based on the geometry of each burn area and the definition of a burn within each burn area, as represented by box 308. The burn definition can include the number of scan lines in each burn area and the length and density of the scan lines, for example.

Shape-adjusting device (e.g., a laser source) 112 and scanner 116 execute the selected burn instructions at step 307. The burn instructions can control the laser operating mode, laser power, focused laser beam spot size, laser beam scanning speed, scanning orientation (0° or 90° to the longitudinal axis Y), line-to-line spacing (line pitch), number of scan lines, scan band size, and any other operating parameters.

For example, the laser source can be operated in a continuous wave mode or a pulsed mode. These modes produce different curvature responses. In the continuous wave mode, a laser beam having a wavelength in the infrared range would provide enough heating of the slider surface without material removal. In contrast, if the laser were operated in the pulsed mode, each pulse would require a high-peak power (energy sustained over a very short period of time (ns)) in order to produce measurable amounts of desired curvature change. This would typically result in deeper laser pockets and a smaller heat-effected zone. The laser spots could be pulsed at any desired frequency.

According to one specific example of the present invention, the laser source delivers continuous-wave laser beam having a power of about 5 watts and a wavelength around 1100 nm. This laser beam is used to scan a burn line that has a melting penetration depth (MPD), which is ten times smaller than that obtained with a pulsed laser being scanned at the same speed.

Due to the fact that curvature response sensitivity can be a function of the scan line location, small steps in curvature change (i.e. high resolution) can be accomplished by using narrow and well defined scan lines that can realize very localized material stress changes. The focused laser spot size on the working surface of the slider, combined with the laser power, determines the width of the burn scan line and the melting penetration depth. The smaller the focused spot size, the narrower the scan line.

After the selected burn pattern has been applied to the working surface of the slider, measuring device 111 measures the resulting shape parameters 310, at step 309. One or more additional passes through process 300 can be made, as represented by dash line 311, if desired, based on the values of the parameters measured at step 309. At step 312, the resulting slider shape is compared with predetermined specifications 313 and a decision is made as to whether the slider is useable. Also, these updated values can be used to model predicted performance characteristics of the slider, such as fly height, pitch and roll.

Other algorithms or steps can be used than those shown in FIG. 7 in alternative embodiments of the present invention. Also, the shape-adjusting device 112 can be operated with a variety of different operating conditions.

6. Surface Shape Characterization Method

Another embodiment of the present invention is directed to an improved method of characterizing the topological shape of a surface, such as the bearing surface of a slider. This method can be used to generate the shape metrics discussed above with reference to FIG. 5 during curvature adjustment, for example, or for modeling the performance of a particular slider, with or without curvature adjustment.

In one embodiment, the slider shape is characterized by first measuring the height ($z_i$) at discrete points ($x_i$, $y_i$) along the overall bearing surface of the slider, relative to a reference height, where $x_i$ represents a location along the longitudinal "x" axis of the slider, and $y_i$ represents a location along the transverse "y" axis of the slider. Next, a target curved surface equation with at least one predefined "ideal" shape characteristic is fitted to the measurement data. In one embodiment, a least-square fit is performed to minimize the error between measured data ($z_i$) and a quadratic polynomial, where three of the six second-order coefficients are specified for the ideal shape characteristics. The error that is minimized is given by:

$$\Sigma[z_i - (a + bx_i + cy_i + D_{target}x_i^2 + E_{target}x_iy_i + F_{target}y_i^2)]^2 = \min \quad \text{EQ. 6}$$

Where a, b and c are unknown coefficients, and $D_{target}$, $E_{target}$ and $F_{target}$ are coefficients that are fixed to correspond to the ideal, global shape of the slider. The three fixed coefficients are derived from the desired (ideal) crown, cross and twist curvatures:

$$D_{target} = -\frac{4 crown_{target}}{sliderlength^2} \quad \text{EQ. 7}$$

$$E_{target} = \frac{twist_{target}}{sliderlength \cdot sliderwidth} \quad \text{EQ. 8}$$

$$F_{target} = -\frac{4 cross_{target}}{sliderwidth^2} \quad \text{EQ. 9}$$

The unknown coefficients a, b, and c are obtained by solving EQS. 6–9. These coefficients represent the vertical offset and the tilt along the x-axis and the y-axis, respectively, of the ideally-shaped curve that has been fitted to the measurement data.

After the unknown coefficients a, b, and c have been obtained, the residual difference or deviation between measurement data and the least-squares "target" fit is given by:

$$residual_i = z_i - (a + bx_i + cy_i + D_{target}x_i^2 + E_{target}x_iy_i + F_{target}y_i^2) \quad \text{EQ. 10}$$

The residual deviation represents how well the fitted curve for the overall slider fits the measured data at each data point. The residual data values are then used to characterize each region of interest on the slider surface, such as each localized bearing surface 220 in FIG. 5.

For example in one embodiment, an average planar offset in each region is calculated by moving the coordinate system to a location in the region, such as the center of the region, and performing a plane fit on a subset of the residual data. Other surfaces in addition to a plane can also be fitted to the subset of the residual data, such as a curved surface defined by a quadratic equation, in alternative embodiments of the present invention. The fitted surface equation can be referred to as a deviation surface equation, which characterizes the topological shape of the region relative to the target curved surface equation.

Figure 8:
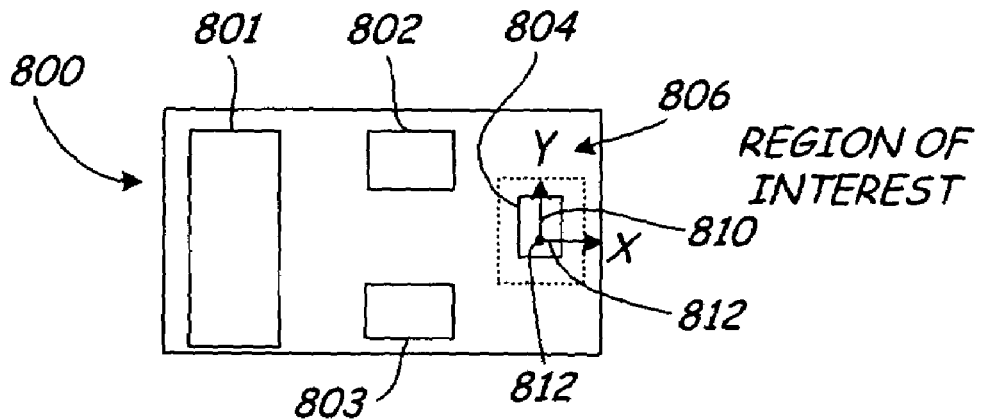
FIG. 8 is a schematic view of a slider or other surface having a plurality of localized areas in which a subset of residual difference values are processed to characterize the topological shape of each area independently.

FIG. 8 is a schematic view of a slider 800 (or other surface) having a plurality of localized areas 801–804. Dashed line 806 represents a localized region of interest. Lines 810 and 811 represent "x" and "y" axes of a coordinate system having an origin 812 that has been moved to the center of region 806.

After the quadratic polynomial in EQ. 6 has been fit to the plurality of localized areas 801–804 (the global surface) and the resulting to residual values have been calculated in EQ. 10, a plane fit is performed using only the residual data within each region, such as region 806. The error that is minimized during the plane fit is given by:

$$\Sigma[residual_i - (z_{region} + xslope_{region}x_i + yslope_{region}y_i)]^2 = \min \quad \text{EQ. 11}$$

where "i" represents the locations of the residual values (in the new local coordinate system on surface 804, the coefficient $z_{region}$, represents an average planar offset (or deviations) in the vertical direction of the fitted plane from a target height of the target (ideal) shape within the region of interest, and $xslope_{region}$ and $yslope_{region}$ are coefficients represents the average offset (or deviation) in slope along x-axis 810 and y-axis 811, respectively, from the target slope within region 806. If a different surface is fit to the subset of the residual data in EQ. 11 in alternative embodiments, such as a surface defined by a quadratic polynomial, additional or different coefficients will be generated. For example, a quadratic polynomial will also generate coefficients corresponding to curvature offsets, in addition to height, x-slope and y-slope offsets.

Figure 9:
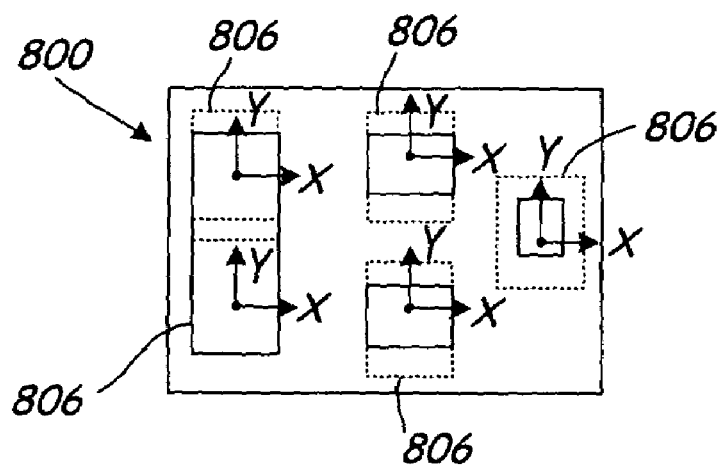
FIG. 9 is a schematic view of the slider shown in FIG. 8 having a local coordinate system applied to each of the localized areas.

The coefficients in EQ. 11 can be calculated separately for each localized region in FIG. 8. An arbitrary number of regions can be defined on the slider surface to get a more accurate surface representation FIG. 9 illustrates slider 800 with a plurality of localized regions 806, each with its own coordinate system.

In one embodiment, the coefficients $z_{region}$, $xslope_{region}$ and $yslope_{region}$ for one or more of the regions are used as shape parameters in EQ. 3 during a slider curvature adjustment process. For example, in FIG. 7, these coefficients are included in the shape metric values that are output at 303 and 310. The measured coefficients at 303 are used to select an appropriate burn pattern at step 304. As mentioned above, the updated coefficients at 310 (after curvature adjustment) can be used to model predicted performance characteristics of the slider, such as fly height, pitch and roll.

The method of characterizing a surface shape and the resulting coefficients generated in EQ. 11 can also be used to model one or more areas on the surface independently of any curvature adjustment process. A geometric model of the topological shape a bearing surface can be generated by starting with a curved surface having the ideal shape, vertical position, and orientation and then simply adding the offsets (e.g., the coefficients in EQ. 11) in each region of interest. The resulting model accurately describes the relative positions of an arbitrary number of regions on the bearing surface. The flying characteristics of a bearing surface can therefore be simulated accurately as a function of the ideal bearing surface shape and the offsets.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. In addition, the term "bearing surface" used in the specification and the claims refers to the overall surface or any individual surface on the side of the slider that faces the disc surface, whether or not the surface is a pressurization surface. The embodiments of the present invention can be applied to any surface having a target or reference shape, such as a bearing surface on a data recording head. The head can be implemented in a disc drive or any other data storage system having a data storage medium of any type. Also, the term "equation" is intended to include any mathematical expression, whether the expression represents an equality or non-equality.

What is claimed is:

1. A method of processing a head slider having a bearing surface, the method comprising:
   (a) selecting a material stress pattern to be applied to a working surface of the slider based on measured and desired contour shape parameters in a plurality of localized areas on the bearing surface, wherein the measured contour shape parameter within a first of the plurality of localized areas is weighted more heavily than those within the other localized areas.

2. The method of claim 1 and further comprising:
   (b) measuring a plurality of contour shape parameters within each of the plurality of localized areas on the bearing surface.

3. The method of claim 2 wherein step (b) comprises:
   (b)(1) measuring slopes of the localized area along first and second orthogonal axes within each of the localized areas; and
   (b)(2) measuring a height of a point on the bearing surface within each of the localized areas.

4. The method of claim 1 wherein step (a) comprises:
   (a)(1) forming a mathematical expression as a function of an overall deviation of a shape of the bearing surface from a desired shape based on local deviations of each of the contour shape parameters from the desired shape parameters within the corresponding localized areas; and
   (a)(2) selecting the material stress pattern from a plurality of stress patterns in order to minimize the mathematical expression in (a)(1).

5. The method of claim 4 wherein (a)(1) comprises expressing the overall deviation as a weighted sum of squares of the local deviations.

6. The method of claim 4 and further comprising:
   (a)(3) for each of the plurality of stress patterns, generating the local deviations of each of the shape parameters based on the measured shape parameter within the corresponding localized area and a predicted response of that shape parameter to the stress pattern.

7. The method of claim 1 wherein step (a)(1) comprises forming the mathematical expression as a further function a predicted deviation of a fly characteristic of the slider from a desired fly characteristic.

8. The method of claim 7 and further comprising:
   (a)(3) for each of the plurality of stress patterns, generating the predicted deviation of the fly characteristic as a function of the shape parameters within each of the plurality of localized areas and the sensitivities of the fly characteristic to the shape parameters.

9. The method of claim 7 wherein step (a)(1) comprises forming the mathematical expression as a further function predicted deviations of a plurality of fly characteristics of the slider from a plurality of corresponding desired fly characteristics.

10. The method of claim 9 wherein at least one of the predicted deviations of the plurality of fly characteristics is weighted more heavily than the other of the predicted deviations of the plurality of fly characteristics.

11. The method of claim 9 wherein the plurality of fly characteristics comprises fly height and pitch and roll attitudes of the slider.

12. The method of claim 1 and further comprising:
   (b) applying the material stress pattern to the working surface of the slider to induce a change in the shape parameters within the plurality of localized areas.

13. The method of claim 1 wherein the slider carries a transducer within the first localized area, which has the shape parameter that is weighted more heavily than the shape parameters within the other localized areas.

14. A method of processing a head slider having a bearing surface, the method comprising:
   (a) receiving a measure of a contour shape parameter within each of a plurality of localized areas on the bearing surface;
   (b) receiving a corresponding desired contour shape parameter for each of the plurality of localized areas;
   (c) forming a mathematical expression as a function of an overall deviation of a shape of the bearing surface from a desired shape based on local deviations of the contour shape parameters from the corresponding desired shape parameters; and
   (d) selecting a material stress pattern to be applied to a working surface of the slider from a plurality of stress patterns in order to reduce the mathematical expression.

15. The method of claim 14 and further comprising:
   (e) applying the material stress pattern selected in (d) to the working surface of the slider to induce a localized shape change within the plurality of localized areas.

16. The method of claim 14 wherein the measured contour shape parameter within a first of the plurality of localized areas is weighted more heavily than those within the other localized areas during selection of the material stress pattern in (d).

17. The method of claim 14 wherein (a) comprises receiving a measure of a plurality of contour shape parameters within each of the plurality of localized areas on the bearing surface.

18. The method of claim 17 wherein the plurality of contour shape parameters comprises:
   slope of the localized area along a first axis;
   slope of the localized area along a second axis, which is orthogonal to the first axis; and
   height of a point on the bearing surface within the corresponding localized area.

19. The method of claim 14 wherein (c) comprises expressing the overall deviation as a weighted sum of squares of the local deviations.

20. The method of claim 19 and further comprising:
(e) for each of the plurality of stress patterns, generating the local deviations of each of the measured shape parameters based on the measured shape parameter based on a predicted response of that shape parameter to the stress pattern.

21. The method of claim 14 wherein (c) comprises forming the mathematical expression as a further function a predicted deviation of a fly characteristic of the slider from a desired fly characteristic.

22. The method of claim 21 and further comprising:
(e) for each of the plurality of stress patterns, generating the predicted deviation of the fly characteristic as a function of predicted responses of the measured shape parameters within each of the plurality of localized areas and the sensitivities of the fly characteristic to the predicted responses.

23. The method of claim 21 wherein (c) comprises forming the mathematical expression as a further function predicted deviations of a plurality of fly characteristics of the slider from a plurality of corresponding desired fly characteristics.

24. The method of claim 21 wherein at least one of the predicted deviations of the plurality of fly characteristics is weighted more heavily than the other of the predicted deviations of the plurality of fly characteristics during selection of the material stress pattern in (d).

25. The method of claim 23 wherein the plurality of fly characteristics comprises fly height and pitch and roll attitudes of the slider.

26. An apparatus for processing a head slider having a bearing surface, the apparatus comprising:
means for selecting a material stress pattern to be applied to a working surface of the slider based on measured and desired contour shape parameters in a plurality of localized areas on the bearing surface, wherein the measured contour shape parameter within a first of the plurality of localized areas is weighted more heavily than those within the other localized areas; and
means for applying the material stress pattern to the working surface of the slider to induce a localized shape change in the plurality of localized areas.

* * * * *